Patented Nov. 19, 1946

2,411,445

UNITED STATES PATENT OFFICE 2,411,445

TREATMENT OF YEAST TO ENHANCE VITAMIN POTENCY THEREOF

Ben Maizel, Chicago, Ill., assignor to Vico Products Company, Chicago, Ill.

No Drawing. Application February 13, 1943, Serial No. 475,763

4 Claims. (Cl. 195—78)

My invention relates to the treatment of wet, live brewer's yeast to bring about material enhancement of the vitamin $B_1$ and riboflavin content thereof.

I have discovered that wet or undried, live, brewer's yeast may be so treated, in a simple and efficacious manner, that the normal vitamin $B_1$ and riboflavin content thereof may be very materially increased, in many cases, at least, doubled or trebled or even still further increased. In general, this is accomplished by subjecting the wet, live brewer's yeast, containing a limited food supply, to a relatively low temperature, that is, a temperature below which any appreciable plasmolysis occurs, but not so low as to prevent such metabolic processes to proceed as will increase the vitamin $B_1$ and riboflavin content of the yeast cells, the wet yeast being maintained at such temperature for a period of time sufficient to bring about the desired enhancement of the vitamin $B_1$ and riboflavin content. While the time during which the wet yeast is maintained at the desired temperature may be varied, in general, I prefer to maintain the wet yeast at such temperature for a period of not substantially less than a week and preferably for between one and two weeks or even a still longer period of time. In general, the vitamin $B_1$ and riboflavin content increases with increase of the time during which the wet yeast is maintained at the desired temperature. In some cases, during the first few days of treatment the vitamin $B_1$ and riboflavin potency of the wet yeast decreases but, after approximately a week or thereabouts, the potency begins gradually to increase and this increase, with passage of time, may amount to as much as two or three or more times the original vitamin $B_1$ and riboflavin potency.

While I have not fully ascertained the mechanism of the reactions which take place which account for the highly unexpected and important results which I have described above, it is my belief that the vitamins in the yeast are part of the respiratory enzyme system used by the yeast in growing and utilizing food. When the food supply is cut off, the yeast cells adapt themselves to utilize the small amount of food available so that their enzyme system expands. If the yeast is allowed to remain without food at room temperature, it dies rapidly; the cell juices are liberated, the process technically known as plasmolysis takes place, and the liberated enzymes kill the other cells, so that, in a relatively short time, the life processes are destroyed. At temperatures below which plasmolysis occurs, the cells have an opportunity to change in the manner described, that is, the enzyme system of which the vitamins are a part expands.

In one illustrative example of the practice of my invention, I have subjected wet, live brewer's yeast, having an original content of 27 International units of vitamin $B_1$ and from 25 to 30 micrograms of riboflavin per gram (calculated on the dried yeast basis), to a temperature of the order of 32 to 37 degrees F. for a period of seven days with the result that, at the end of such time, the vitamin $B_1$ content had increased to between 50 and 55 International units and the riboflavin content had increased to between 40 and 50 micrograms per gram (calculated on the dried yeast basis).

I have also discovered that the vitamin $B_1$ and riboflavin potency of brewer's yeast increases at a much more rapid rate, after an initial few days during which such potency appears to decrease, if such yeast is washed before being subjected to the treatment at the desired temperatures and for the required length of time. Thus, for example, I have taken two samples of a wet, live brewer's yeast, just as received from the brewery, washed one of said samples with water to remove most but not all of the beer, and placed both the washed and the unwashed samples in a refrigerator at a temperature between about 32 degrees F. and 37 degrees F. During the first few days, the vitamin $B_1$ and riboflavin potency of both samples decreased, and then, after approximately a week, the potency began gradually to climb. In this particular test, the vitamin $B_1$ and riboflavin content of the washed yeast increased much more rapidly than in the case of the unwashed yeast. At the end of approximately two weeks, the samples of washed yeast contained 45 International units of vitamin $B_1$ and 40 micrograms of riboflavin per gram (calculated on the basis of the dried yeast). The initial potency of such yeast was 27 International units of vitamin $B_1$ and 27 micrograms of riboflavin per gram (calculated on the basis of the dried yeast).

It will be understood, of course, that, after subjection of the wet, live brewer's yeast to treatment in accordance with my process, the yeast may be dried and extracted in accordance with methods known in the prior art in order to produce extracts containing a high content of vitamin $B_1$ and riboflavin as well as such other vitamin constituents as make up the vitamin B complex of yeast. Instead of drying the yeast treated in accordance with my invention, I may subject the treated wet yeast to extraction methods to produce vitamin-containing extracts. Suitable extraction methods are known in the art and form no part, per se, of my present invention. Examples of such processes are those described in my prior patent, No. 2,193,876, and in Journal of Biological Chemistry, vol. 100, p. 195 (1933).

I have referred hereinabove to the utilization of temperatures sufficiently low to prevent appreciable plasmolysis but sufficient, however, to permit the metabolic processes to proceed which result in the increase of the vitamin $B_1$ and riboflavin content in the yeast cells. The temperature may, however, be decreased somewhat or elevated, with respect to the above preferred range, without departing from the principles and teachings of my present invention. Thus, for example, temperatures as high as 50 degrees F. or higher may be employed. Those skilled in the art will, in the light of my description, readily be able to select other temperatures effective to produce the results which I have described herein.

I have stated above that the yeast is maintained, at the specified temperature and for the stated period of time, in the presence of a limited food supply. I use the term "limited food supply" to mean such an amount or character of food or nutrient material that the yeast will not appreciably grow or multiply under the conditions of treatment of the yeast. In wet, live brewer's yeast the yeast solids may constitute around 17%, the balance being alcohol, carbohydrates, proteins, moisture, etc. Such yeast contains a limited food supply. In certain instances, I may add nutrient materials to certain brewer's yeasts without, however, appreciably exceeding the amount or character of such materials as would enable multiplication or growth of the yeast under the conditions of treatment pursuant to the teachings of my present invention.

In the light of the foregoing description of my invention, it will be seen that I have evolved a new and highly useful process, simple in nature and of marked importance. While I have described my invention in detail, it will be understood that the scope thereof is not to be limited other than is set out in the claims.

What I claim as new and desire to protect by Letters Patent of the United States is:

1. In a method of substantially increasing the vitamin $B_1$ and riboflavin content of live, wet brewer's yeast, the step which comprises maintaining said wet, live brewer's yeast, in the presence of a limited food supply, at a temperature between about 32 degrees F. and about 50 degrees F. for a period of not substantially less than a week.

2. A method of substantially increasing the vitamin $B_1$ and riboflavin content of brewer's yeast which comprises maintaining live, wet brewer's yeast, in the presence of a limited food supply, at a temperature between about 32 degrees F. and 50 degrees F. for not substantially less than one week, and then drying said yeast to provide a dried brewer's yeast having a materially augmented content of vitamin $B_1$ and riboflavin.

3. A method of substantially increasing the normal vitamin $B_1$ and riboflavin content of washed, live, wet brewer's yeast which comprises maintaining said washed, live, wet brewer's yeast, in the presence of a limited food supply, at a temperature between about 32 degrees F. and about 50 degrees F., said yeast being maintained at said temperature for not substantially less than a week and sufficient to bring about an increase of at least 50% in the vitamin $B_1$ content and an increase of generally corresponding character in the riboflavin content of the yeast cells.

4. A method of substantially increasing the normal vitamin $B_1$ and riboflavin content of live, wet brewer's yeast which comprises maintaining said live, wet brewer's yeast, in the presence of a limited food supply, at a temperature between about 32 degrees F. and about 50 degrees F. for a period of not substantially less than a week, whereby there is brought about an increase of at least 50% in the vitamin $B_1$ content and an increase of generally corresponding character in the riboflavin content of the yeast cells.

BEN MAIZEL.